(12) United States Patent
Lyusin

(10) Patent No.: US 11,802,974 B2
(45) Date of Patent: Oct. 31, 2023

(54) HIGHLY RELIABLE NAVIGATION RECEIVER

(71) Applicant: Magellan Systems Japan, Inc., Hyogo (JP)

(72) Inventor: Sergey Lyusin, Moscow (RU)

(73) Assignee: Magellan Systems Japan, Inc., Amagasaki (JP)

( * ) Notice: Subject to any disclaimer, the term of this patent is extended or adjusted under 35 U.S.C. 154(b) by 160 days.

(21) Appl. No.: 17/341,195

(22) Filed: Jun. 7, 2021

(65) Prior Publication Data

US 2021/0293971 A1    Sep. 23, 2021

Related U.S. Application Data

(63) Continuation of application No. PCT/IB2018/059973, filed on Dec. 12, 2018.

(51) Int. Cl.
    *G01S 19/20* (2010.01)
    *G01S 19/23* (2010.01)
    *G01S 19/42* (2010.01)

(52) U.S. Cl.
    CPC .............. *G01S 19/20* (2013.01); *G01S 19/23* (2013.01); *G01S 19/42* (2013.01)

(58) Field of Classification Search
    CPC ........... G01S 19/20; G01S 19/23; G01S 19/42
    (Continued)

(56) References Cited

U.S. PATENT DOCUMENTS 9,784,847 B1 * 10/2017 Barsby .................... G01S 19/48
2015/0145724 A1    5/2015 Kana et al.
(Continued)

FOREIGN PATENT DOCUMENTS

CN    105891861    8/2016
FR    3006771    12/2014
(Continued)

OTHER PUBLICATIONS

Lee et al., "New Advanced ARAIM with Improved Availability for Detecting Constellatio-wide Faults, Using two Independent Constellations", ITM 2012—Proceedings of the 2012 International Technical Meeting of the Institute of Navigation, The Institute of Navigation, Feb. 1, 2012, Abstract.
(Continued)

*Primary Examiner* — Harry K Liu
(74) *Attorney, Agent, or Firm* — Beyer Law Group LLP

(57) ABSTRACT

A GNSS receiver receives GNSS signals from satellites of a plurality of Global Navigation Satellite Systems, and a front end section thereof outputs corresponding navigation signals. A plurality of baseband processing channels receive and process the navigation signals so as to output navigation measurements which are divided and grouped into a plurality of sets. Each of a plurality of first application processing blocks receives a respective set of the navigation measurements and calculates a navigation solution. A general application processing block receives and compares the navigation solutions from the plurality of first application processing blocks, determines if there is a faulty navigation solution which is inconsistent or substantially different from other navigation solutions, discards the faulty navigation solution, produces a common navigation solution based on the remaining or non-faulty navigation solutions, and suspends, for a predetermined time period, use of the navigation measurements corresponding to the faulty navigation solution.

18 Claims, 3 Drawing Sheets

(58) Field of Classification Search
USPC .................................................. 342/357.45
See application file for complete search history.

(56) References Cited

U.S. PATENT DOCUMENTS

| | | |
|---|---|---|
| 2015/0226858 A1 | 8/2015 | Leibner et al. |
| 2016/0377726 A1 | 12/2016 | Schipper et al. |
| 2017/0336517 A1 | 11/2017 | Petillon |
| 2018/0259650 A1 | 9/2018 | Antoni et al. |
| 2023/0037090 A1* | 2/2023 | Wang .................... H04W 52/08 |

FOREIGN PATENT DOCUMENTS

| | | | |
|---|---|---|---|
| WO | WO-2007059655 A1 * | 5/2007 | ............. H04B 1/711 |
| WO | 2017/208160 | 12/2017 | |

OTHER PUBLICATIONS

International Search Report from International Application No. PCT/IB2018/059973 dated Sep. 11, 2019.
Written Opinion from International Application No. PCT/IB2018/059973 dated Sep. 11, 2019.

* cited by examiner

| Signal | Notation | Signal Frequency Range, MHz |
|---|---|---|
| GLONASS L1 | G1 | 1593 ~ 1610 |
| BeiDou B1-2 | B1-2 | 1580 ~ 1600 |
| GPS L1, Galileo E1, QZSS L1 | L1 | 1563 ~ 1587 |
| BeiDou B1 | B1 | 1551 ~ 1571 |
| Galileo E6, QZSS LEX | E6 | 1259 ~ 1299 |
| BeiDou B3 | B3 | 1259 ~ 1279 |
| GLONASS L2 | G2 | 1238 ~ 1254 |
| GPS L2, QZSS L2 | L2 | 1218 ~ 1238 |
| BeiDou B2 | B2 | 1197 ~ 1217 |
| GLONASS L3 | G3 | 1191 ~ 1211 |
| Galileo E5 | E5 | 1167 ~ 1217 |
| GPS L5, QZSS L5 | L5 | 1164 ~ 1188 |

FIG. 2

HIGHLY RELIABLE NAVIGATION RECEIVER

CLAIM OF PRIORITY

This application is a Continuation of International Application No. PCT/IB2018/059973 filed on Dec. 12, 2018, which is hereby incorporated by reference.

BACKGROUND OF THE INVENTION

1. Field of the Invention

The present invention relates to Global Navigation Satellite Systems (GNSS) receivers. More specifically, the present invention relates to a highly reliable GNSS receiver including a plurality of application processing blocks.

2. Description of the Related Art

Many GNSS applications have strict reliability requirements as they involve Safety of Life (SoL) services and critical missions such as aviation, maritime, and land transportation. In this context, the concept of reliability and service integrity is defined based on the level of trust in navigation solutions, given the variety of error sources affecting the system. The integrity also requires the capability of providing timely warnings to the user when the service should not be used.

At present, such increase in the reliability of positioning is achieved through the use of methods such as Receiver Autonomous Integrity Monitoring (RAIM) or Signal Quality Monitoring (SQM). For example, RAIM uses a user algorithm which makes use of measurements redundancy to compare the pseudorange measurements and checks the relative consistency among themselves. If inconsistency is detected, the most likely "failed" satellite is determined. A key assumption usually made in RAIM algorithms for civil aviation is that only a few satellites may be faulty, i.e. the probability of multiple satellite failures is negligible. That is, the method works efficiently in the case where the received signals have large redundancy and only a few "bad" signals present therein. SQM only monitors physical distortion of the signals on the satellite board or transmission problems. In addition, the use of methods such as SQM and RAIM requires the complication of hardware and firmware.

BRIEF DESCRIPTION OF THE INVENTION

With the traditional approach, measurements and data of all satellite signals received by the GNSS navigation receiver are processed together in a single Application Block to calculate Position, Velocity, and Timing (PVT), etc, since this allows the most efficient use of RAIM and SQM utilizing the signal redundancy. However, situations (and they occurred in reality) are possible, when one of the navigation systems that make up GNSS works incorrectly. This may be due, for example, to the error in the operation of the ground control complex of this specific navigation system. In this case, the navigation data transmitted from all of the satellites of this navigation system may be incorrect, although the physical qualities of the transmitted signals remain good. In this case, RAIM will not be able to help, since the number of "bad" signals will be too large to handle, and SQM will not be able to help, because the physical quality of signals from satellites will remain good.

Accordingly, the present invention employs the following approach: separately obtaining a navigation solution (Position, Velocity, Time—PVT) for each system in a respective Application Processing Block, and then jointly processing these solutions in a General (or Combined) Application Processing Block. In this case, if, for example, a solution obtained from one of the navigation systems is significantly different from other solutions, such a significantly-different solution can be discarded, and the use of the corresponding navigation system may be suspended temporarily.

In accordance with one aspect of the invention, a GNSS receiver includes an antenna configured to receive GNSS signals from satellites of a plurality of Global Navigation Satellite Systems (GNSS), a front end section, a plurality of baseband processing channels, a plurality of first application processing blocks, and a general application processing block. The front end section includes one or more chains of filters, amplifiers, downconverters, and Analog-to-Digital Convertors (ADC). The front end section is configured to process the GNSS signals received by the antenna and output corresponding navigation signals.

The plurality of baseband processing channels are configured to receive and process the navigation signals output from the front end section, where each baseband processing channel outputs navigation measurements for a specific navigation signal from a specific satellite of a specific system among the plurality of GNSS. In addition, the plurality of baseband processing channels are divided into a plurality of sets, such that each set contains multiple baseband processing channels.

Each of the plurality of first application processing blocks is configured to receive the navigation measurements from a corresponding set of the multiple baseband processing channels, and to calculate, from the received navigation measurements, a navigation solution including at least one of position, velocity, and timing.

The general application processing block is configured to receive and process navigation solutions from the plurality of first application processing blocks. The general application processing block includes a controller configured to compare the navigation solutions and determine if there is a faulty navigation solution which is inconsistent or substantially different from other navigation solutions, discard the faulty navigation solution thus determined, produce a common navigation solution based on the remaining navigation solutions, and suspend, for a predetermined time period, use of the navigation measurements corresponding to the faulty navigation solution.

In accordance with one embodiment of the present invention, each set of the multiple baseband processing channels may be dedicated to process the navigation signals of a specific GNSS. Alternatively, each set of the multiple baseband processing channels may be dedicated to process the navigation signals of a specific GNSS in a predetermined frequency range.

In accordance with one embodiment of the present invention, the general application processing block is further configured to receive additional information to determine the faulty navigation solution. The additional information may include data from sensors.

In accordance with one embodiment of the present invention, each of the application processing blocks is further configured to obtain differential corrections from an external source to produce the navigation solution.

In accordance with one embodiment of the present invention, each of the baseband processing channels is provided with a signal quality monitoring (SQM) module.

In accordance with one embodiment of the present invention, the controller of the general application processing block is further configured to output a warning signal if the inconsistency among the navigation solution exceeds a predetermined threshold. In addition the controller may be further configured to output a warning signal if the navigation measurements corresponding to more than one set of the multiple baseband processing channels are suspended.

In accordance with another aspect of the present invention, a method for processing GNSS signals in a GNSS receiver includes (a) receiving the GNSS signals from satellites of a plurality of Global Navigation Satellite Systems (GNSS), (b) processing the GNSS signals in a front end section including one or more chains of filters, amplifiers, downconverters and Analog-to-Digital Convertors (ADC), thereby outputting navigation signals, (c) processing the navigation signals via a plurality of baseband processing channels such that each baseband processing channel outputs navigation measurements for a specific navigation signal from a specific satellite of a specific system among the plurality of GNSS, (d) dividing and grouping outputs from the plurality of baseband processing channels into a plurality of sets such that each set contains the navigation measurements output from multiple baseband processing channels, (e) processing the navigation measurements set by set via a corresponding first application processing block to calculate a navigation solution including at least one of position, velocity, and timing, thereby producing a plurality of navigation solutions corresponding to the plurality of sets, (f) processing the plurality of navigation solutions via a general application processing block, by comparing the navigation solutions and determining if there is a faulty navigation solution which is inconsistent or substantially different from other navigation solutions, discarding the faulty navigation solution thus determined, and producing a common navigation solution based on the remaining navigation solutions, and (g) suspending, for a predetermined time period, use of the navigation measurements corresponding to the faulty navigation solution.

In accordance with one embodiment of the present invention, the dividing and grouping the outputs includes dividing the plurality of baseband processing channels into a plurality of sets each dedicated to process the navigation signals of a specific GNSS. The dividing and grouping the outputs may include dividing the plurality of baseband processing channels into a plurality of sets each dedicated to process the navigation signals of a specific GNSS in a predetermined frequency range.

The may further includes receiving additional information to determine the faulty navigation solution. The additional information may include data from sensors.

BRIEF DESCRIPTION OF THE DRAWINGS

The present invention is illustrated by way of example, and not by way of limitation, in the FIG's of the accompanying drawings and in which like reference numerals refer to similar elements and in which:

FIG. 2 is a table showing examples of currently available GNSS signals from different GNSS systems (GPS, GLONASS, Galileo, BeiDou, and QZSS) and their frequency ranges.

DETAILED DESCRIPTION OF EMBODIMENTS OF THE INVENTION

Figure 1:
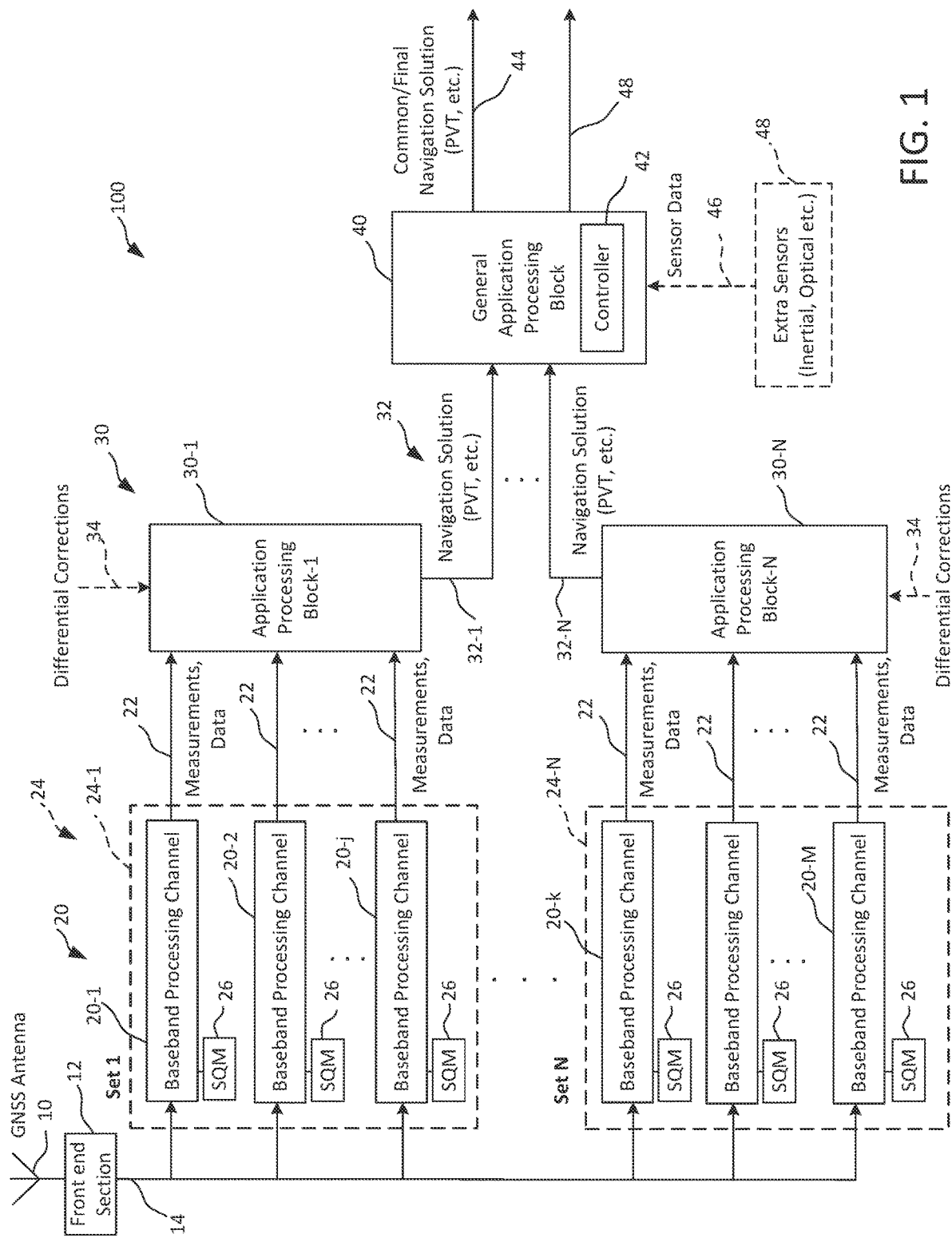
FIG. 1 is a block diagram schematically illustrating a GNSS receiver in accordance with one embodiment of the present invention.

FIG. 1 schematically shows a GNSS receiver 100 in accordance with one embodiment of the present invention. The GNSS receiver 100 includes a GNSS antenna 10, a front end section 12, a plurality of baseband processing channels 20, a plurality of first application processing blocks 30, and a general application processing block 40. The antenna 10 receives GNSS signals from satellites of a plurality of Global Navigation Satellite Systems (GNSS). The GNSS includes, but not limited to, United States Global Positioning System (GPS), Russian Global Orbiting Navigation Satellite System (GLONASS), European Union's Galileo, China's regional BeiDou Satellite Navigation System (BDS, formerly known as Compass), and Japanese Quasi-Zenith Satellite System (QZSS).

The front end section 12 includes one or more chains of filters, amplifiers, downconverters and Analog-to-Digital Convertors (ADC), as is well known to those of ordinary skill in the art. The front end section 12 may be implemented in hardware, any type of integrated circuits (IC), software, and any combination thereof, and configured to process the GNSS signals received by the antenna 12 and output corresponding navigation signals 14.

The remaining sections of the GNSS receiver 100 may also be constructed as a computer including a CPU, a RAM, a ROM and the like therein so as to have various functional blocks, including those which are illustrated in FIG. 1. These functional blocks can be configured in a software manner by installing computer programs realizing the respective functions. However, it is also possible that part of or the whole of the functional blocks may be configured in a hardware manner, including any types of integrated circuits (ICs).

The plurality of baseband processing channels 20 (20-1, 20-2, . . . , 20-M) receive and process the navigation signals 14 output from the front end section 12. Each of the baseband processing channels 20 outputs navigation measurements 22 for a specific navigation signal 14 from a specific satellite of a specific system among the plurality of GNSS. As shown in FIG. 1, the plurality of baseband processing channels 20 are divided into a plurality of sets 24 (24-1, 24-2, . . . , 24-N), such that each set 24 contains multiple baseband processing channels 20. In accordance with one embodiment of the present invention, as shown in FIG. 1, each of the baseband processing channels 20 may be provided with a signal quality monitoring (SQM) module 26 so as to monitor physical quality of the received signal in the respective base band, and the navigation signals 14 which do not satisfy certain criteria may be eliminated or discarded so as not to disadvantageously affect the measurements.

In accordance with one embodiment of the present invention, each set 24 of the multiple baseband processing channels 20 may be dedicated to process the navigation signals 14 belong to a specific GNSS. For example, the first set 24-1 may be dedicated to process the navigation signals 14 from GPS, the second set 24-2 may be dedicated to process the navigation signals 14 from GLONASS, and the like. Alternatively, each set 24 of the multiple baseband processing channels 20 may be dedicated to process the navigation signals 14 in a predetermined frequency range of a specific GNSS. For example, the first set 24-1 may processes the navigation signals 14 of GPS L1, the second set 24-1 may process the navigation signals GPS L2, and the like. FIG. 2 shows examples of currently available GNSS signals from different GNSS systems and their frequency ranges. As mentioned above, each baseband processing channel generates measurements (and other data) 22 for the navigation signal 16 from a specific satellite of a predetermined GNSS.

As shown in FIG. 1, the plurality of first application processing blocks 30 (30-1, 30-2, ..., 30-N) are provided to the plurality of sets 24 (24-1, 24-2, ..., 24-N) such that each of the plurality of first application processing blocks 30 receives the navigation measurements 22 from the corresponding set 24 of the multiple baseband processing channels 20. Each first application processing block 30-$n$ calculates and outputs a navigation solution 32-$n$ including at least one of position, velocity, and timing (where n=1, 2, ... . N). For example, the first application processing block 30-1 calculates the navigation solution 32-1 based on the navigation measurements 22 obtained through a plurality of baseband processing channels 20-1 to 20-$j$ in the corresponding set 24-1. In addition, as shown in FIG. 1, each of the first application processing blocks 30 may obtain differential corrections 34 from an external source to produce the navigation solution.

The general application processing block 40 receives and processes the navigation solutions 32 from the plurality of first application processing blocks 30. The general application processing block 40 includes a controller 42 that compares the navigation solutions 32 and determines if there is a faulty navigation solution 32-$i$ which is inconsistent or substantially different from other navigation solutions 32. Logically, or in an ideal situation, the navigation solutions 32 (32-1, 32-2, ..., 32-N) which are independently calculated by the respective first application processing blocks 30 would agree with each other with predictable and/or statistical errors under given conditions and circumstances, because the navigation solutions are obtained for the same GNSS receiver 100.

However, in such a situation in which one of the navigation systems has a system-wise problem such as an operational error in its ground control complex, the navigation data transmitted from all of the satellites in the same navigation system may be incorrect. Since such a system-wise error may not necessarily deteriorate the physical qualities of the transmitted signals, the SQM modules 26 will not be able to detect and/or eliminate such erroneous signals. And all of the singles received in a specific set 24 of baseband processing channels 20 for the specific navigation system may be erroneous, and thus the RAIM algorithm, if employed in the application processing bock 30, will not work either, as its premise is that the probability of errors in multiple satellite signals is negligible.

Accordingly, in case of such a system-wise failure or multiple erroneous signals, the navigation solution 32-$i$ calculated in the corresponding first application processing block 30-$i$ is likely to be inconsistent with, or substantially different from other navigation solutions 32 calculated in the remaining first application processing blocks 30. Thus, the controller 42 of the general application processing block 40 determines such a navigation solution 32-$i$ as a faulty navigation solution, discards the faulty navigation solution 32-$i$, and produces a common navigation solution 44 based on the remaining navigation solutions 32. The controller 42 suspends, for a predetermined time period, use of the navigation measurements 22 corresponding to, i.e., used to calculate, the faulty navigation solution 32-$i$ in the first application processing block 30-$i$ for calculating the navigation solutions 32.

In accordance with one embodiment of the present invention, the general application processing block 40 may receive additional information 46 to determine the faulty navigation solution. The additional information 46 may include data from external sensors 48, such as inertial sensor, optical sensor, and the like.

In addition, the controller 42 may outputs a warning signal 48 if the inconsistency among the navigation solutions 32 exceeds a predetermined threshold. The controller 42 may be further configured to outputs a warning signal if the navigation measurements 32 corresponding to more than one set 24 of the multiple baseband processing channels are suspended.

FIG. 2 illustrates a method 200 for processing GNSS signals in a GNSS receiver in accordance with one embodiment of the present invention. The GNSS receiver may be the GNSS receiver 100 shown in FIG. 1. The method may be performed using hardware, including any type of integrated circuits (IC), software (computer programs), and any combination thereof. For example, the method may be performed by the GNSS receiver including a CPU, a RAM, a ROM and the like therein and has various illustrated functional blocks.

The GNSS signals from satellites of a plurality of Global Navigation Satellite Systems (GNSS) are received at a GNSS antenna (202). The received GNSS signals are then processed in a front end section including one or more chains of filters, amplifiers, downconverters and Analog-to-Digital Convertors (ADC), so as to output navigation signals (204). Then, the navigation signals are processed via a plurality of baseband processing channels such that each baseband processing channel outputs navigation measurements for a specific navigation signal from a specific satellite of a specific system among the plurality of GNSS (206).

The outputs from the plurality of baseband processing channels are divided and grouped into a plurality of sets, such that each set contains the navigation measurements output from multiple baseband processing channels (208). The outputs from the plurality of baseband processing channels may be grouped into the sets such that each set includes the navigation signals of a specific GNSS, or such that each set includes the navigation signals of a specific GNSS in a predetermined frequency range.

The grouped navigation measurements are processed set by set via a corresponding first application processing block to calculate a navigation solution for each set so as to produce a plurality of navigation solutions corresponding to the plurality of sets (210). The navigation solution includes at least one of position, velocity, and timing.

The plurality of navigation solutions are then processed via a general application processing block (212) which receives the plurality of navigation solutions from the first application processing blocks. By comparing the plurality of navigation solutions, it is determined if there is a faulty navigation solution among them (214). For example, a navigation solution which is inconsistent or substantially different from other navigation solutions may be determined to be faulty or erroneous. Any statistical calculation can be used, for example, to determine a deviation of a specific navigation solution with respect to the entire navigation solutions. A respective threshold value for such a deviation may be used to determine if a navigation solution (for example, the position of the GNSS receiver, the velocity of the GNSS receiver, or the timing solution) obtained from a specific set of the navigation measurements is faulty. The process of determining a faulty navigation solution may use additional information received from an external source, such as data from external sensors, for example, inertia sensor and/or optical sensor.

Figure 3:
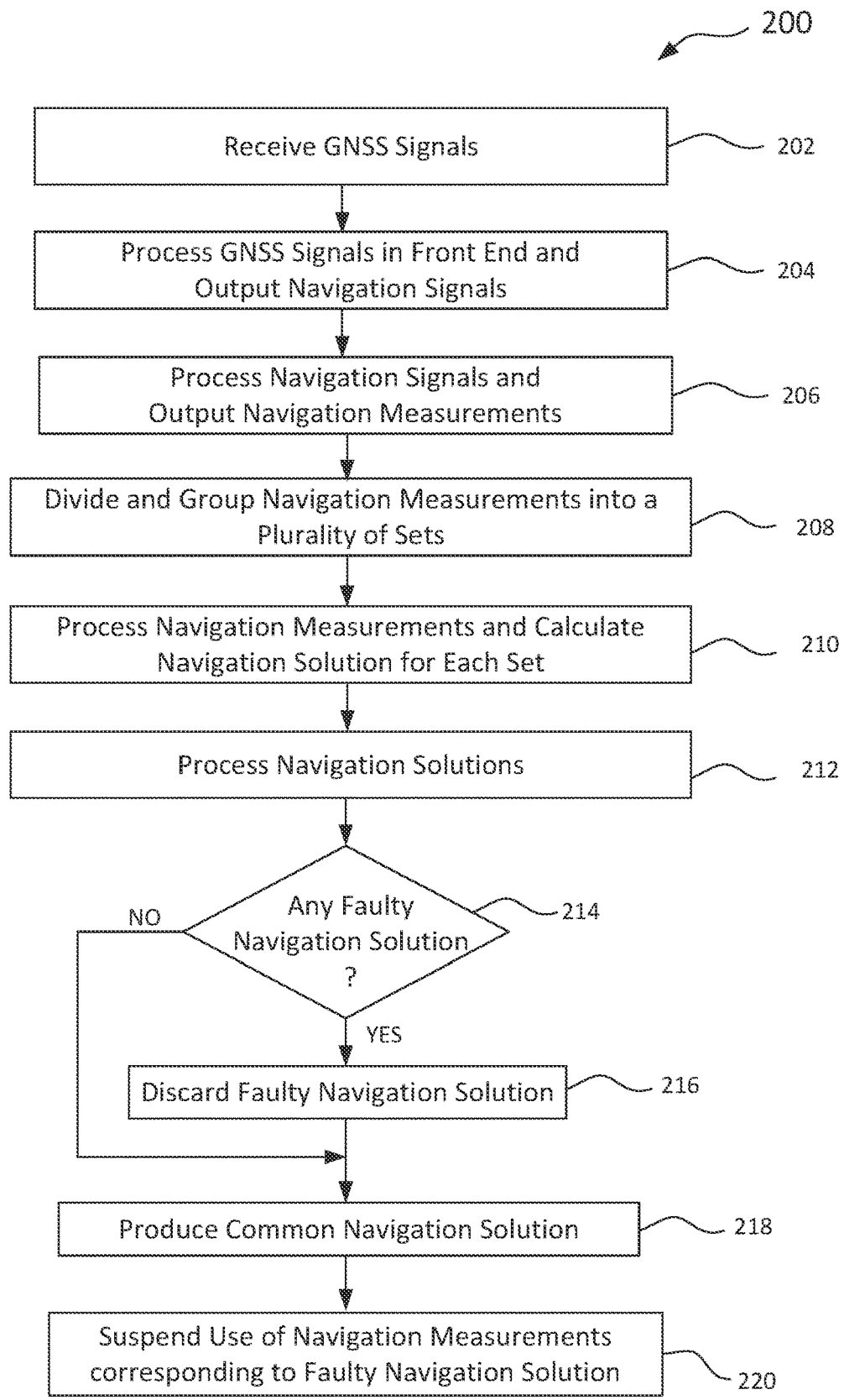
FIG. 3 is a flow chart showing a method for processing GNSS signals in a GNSS receiver in accordance with one embodiment of the present invention.

The faulty navigation solution thus determined is discarded (216), and a common navigation solution is produced based on the remaining navigation solutions (218). The common navigation solution, or the final navigation solution, may be the average of the remaining navigation solutions. If no faulty navigation solution is found in step 214, all of the navigation solutions from the plurality of first application processing block may be used to produce the common navigation solution (216), as shown in FIG. 3, which may enhance the reliability of the final navigation solution.

In case where a faulty navigation solution is found, use of the navigation measurements produced the faulty navigation solution may be suspended for a predetermined time period (220).

Since the finding of a faulty navigation solution indicates that a system-wise or an unusual wide-range error has occurred, a warning signal may be issued. For example, such a warning signal may be output if the inconsistency among the navigation solutions exceeds a predetermined threshold, or if more than one navigation solutions are determined to be faulty and the navigation measurement sets corresponding thereto are suspended.

While this invention has been described in terms of several preferred embodiments, there are alterations, permutations, modifications, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A GNSS receiver, comprising:
   an antenna configured to receive GNSS signals from satellites of a plurality of Global Navigation Satellite Systems (GNSS);
   a front end section including one or more chains of filters, amplifiers, downconverters and Analog-to-Digital Convertors (ADC), the front end section being configured to process the GNSS signals received by the antenna and output corresponding navigation signals;
   a plurality of baseband processing channels configured to receive and process the navigation signals output from the front end section, each baseband processing channel outputting navigation measurements for a specific navigation signal from a specific satellite of a specific system among the plurality of GNSS, the plurality of baseband processing channels being divided into a plurality of sets each containing multiple baseband processing channels;
   a plurality of first application processing blocks, each configured to receive the navigation measurements from a corresponding set of the multiple baseband processing channels, and to calculate, from the received navigation measurements, a navigation solution including at least one of position, velocity, and timing; and
   a general application processing block configured to receive and process navigation solutions from the plurality of first application processing blocks, the general application processing block including a controller configured to compare the navigation solutions and determine if there is a faulty navigation solution which is inconsistent or substantially different from other navigation solutions, discard the faulty navigation solution thus determined, produce a common navigation solution based on the remaining navigation solutions, and suspend, for a predetermined time period, use of the navigation measurements corresponding to the faulty navigation solution.

2. The GNSS receiver of claim 1, wherein each set of the multiple baseband processing channels is dedicated to process the navigation signals of a specific GNSS.

3. The GNSS receiver of claim 1, wherein each set of the multiple baseband processing channels is dedicated to process the navigation signals of a specific frequency range.

4. The GNSS receiver of claim 1, wherein the general application processing block is further configured to receive additional information to determine the faulty navigation solution.

5. The GNSS receiver of claim 4, wherein the additional information includes data from sensors.

6. The GNSS receiver of claim 1, wherein each of the first application processing blocks is further configured to obtain differential corrections from an external source to produce the navigation solution.

7. The GNSS receiver of claim 1, wherein each of the baseband processing channels is provided with a signal quality monitoring (SQM) module.

8. The GNSS receiver of claim 1, wherein the controller is further configured to output a warning signal if the inconsistency among the navigation solutions exceeds a predetermined threshold.

9. The GNSS receiver of claim 1, wherein the controller is further configured to output a warning signal if the navigation measurements corresponding to more than one set of the multiple baseband processing channels are suspended.

10. A method for processing GNSS signals in a GNSS receiver, the method comprising:
   receiving the GNSS signals from satellites of a plurality of Global Navigation Satellite Systems (GNSS);
   processing the GNSS signals in a front end section including one or more chains of filters, amplifiers, downconverters and Analog-to-Digital Convertors (ADC), thereby outputting navigation signals;
   processing the navigation signals via a plurality of baseband processing channels such that each baseband processing channel outputs navigation measurements for a specific navigation signal from a specific satellite of a specific system among the plurality of GNSS;
   dividing and grouping outputs from the plurality of baseband processing channels into a plurality of sets such that each set contains the navigation measurements output from multiple baseband processing channels;
   processing the navigation measurements set by set via a corresponding first application processing block to calculate a navigation solution including at least one of position, velocity, and timing, thereby producing a plurality of navigation solutions corresponding to the plurality of sets;
   processing the plurality of navigation solutions via a general application processing block, by comparing the navigation solutions and determining if there is a faulty navigation solution which is inconsistent or substantially different from other navigation solutions, discarding the faulty navigation solution thus determined, and producing a common navigation solution based on the remaining navigation solutions; and suspending, for a predetermined time period, use of the navigation measurements corresponding to the faulty navigation solution.

11. The method of claim 10, wherein the dividing and grouping the outputs includes dividing the plurality of baseband processing channels into a plurality of sets each dedicated to process the navigation signals of a specific GNSS.

12. The method of claim 10, wherein the dividing and grouping the outputs includes dividing the plurality of baseband processing channels into a plurality of sets each dedicated to process the navigation signals of a specific frequency range.

13. The method of claim 10, further comprising: receiving additional information to determine the faulty navigation solution.

14. The method of claim 13, wherein the additional information includes data from sensors.

15. The method of claim 10, wherein the processing the navigation measurements includes obtaining differential corrections from an external source to produce the navigation solution.

16. The method of claim 10, wherein the processing the navigation signals includes monitoring signal quality using a signal monitoring (SQM) module.

17. The method of claim 1, further comprising:
outputting a warning signal if the inconsistency among the navigation solutions exceeds a predetermined threshold.

18. The method of claim 1, further comprising:
outputting a warning signal if the navigation measurements corresponding to more than one set of the multiple baseband processing channels are suspended.

* * * * *